United States Patent [19]

Davidson

[11] Patent Number: 4,515,449
[45] Date of Patent: May 7, 1985

[54] HEAD HARNESS FOR GLASSES

[76] Inventor: Katharine H. Davidson, 74 E. 2500 North, Vernal, Utah 84078

[21] Appl. No.: 467,148

[22] Filed: Feb. 16, 1983

[51] Int. Cl.$^3$ ............................................. G02C 3/00
[52] U.S. Cl. ................................. 351/156; 351/157
[58] Field of Search ..................... 351/123, 156, 157

[56] References Cited

U.S. PATENT DOCUMENTS 2,504,524  4/1950  Hayward ..................... 3 ST/156 X

OTHER PUBLICATIONS

Madison Dental, "Safe T Gard", 12/1970.

*Primary Examiner*—Rodney B. Bovernick
*Attorney, Agent, or Firm*—B. Deon Criddle

[57] ABSTRACT

A head harness for glasses comprised of a first elongated strap that fits over the head of a person and containing closed loops at each end for engaging the midsection of the temple pieces of a pair of eyeglasses frames; a second elongated strap that fits around the rear of the head of a person and containing closed loops for engaging the rear sections of temple pieces; and an elongated strap that is sewn at each of its ends to the midsections of the first and second elongated straps. The straps are all constructed in a preadjusted length and are made of a slightly elastic material in order to provide a secure fit when used with different style eyeglasses and different head sizes.

1 Claim, 1 Drawing Figure

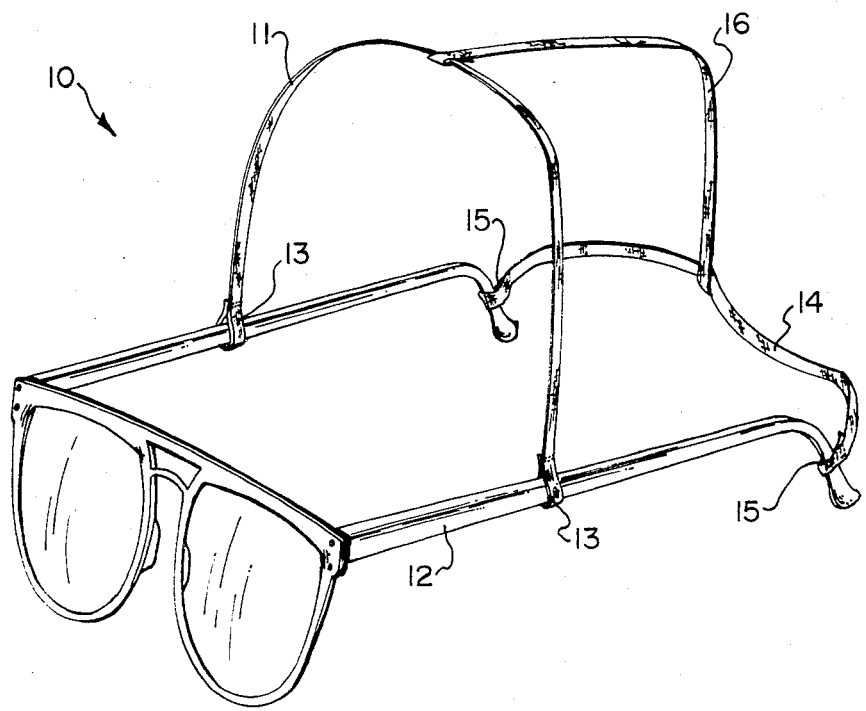

HEAD HARNESS FOR GLASSES

BACKGROUND OF THE INVENTION

1. Field of the Invention

The present invention pertains to devices used for the securing of eyeglasses to a person.

2. Description of the Prior Art

There are a number of headband-type devices known in the prior art for securing faceshields on the head of a wearer. See for example, U.S. Pat. Nos. 3,214,767 (Weber); and 3,214,768 (Bohner). The above devices are quite complex and are designed for use with heavy-duty protective gear rather than eyeglasses.

There are also a number of devices known in the prior art which are used in holding eyeglasses in place. A rigid, semi-helmet device is shown in U.S. Pat. No. 1,370,806 (Garner), and an adjustable, semi-helmet device is shown in U.S. Pat. No. 2,504,524 (Hayward). Examples of retaining devices employing adjustable straps to be used with ordinary eyeglasses frames are shown in U.S. Pat. Nos. 3,397,026 (Spina); 3,502,396 (Greenburg); 3,450,467 (Phillips); and 2,541,493 (Barroso). These devices, however, are of limited usefullness and are difficult to use by young children or those with physical or mental handicaps. The Spina device has a loop that remains loose behind the head and presents a safety problem. The Phillips, Greenberg and Barroso devices as well as the Spina device are difficult to adjust and are awkward.

It is desirable that an eyeglasses retaining device be simple to use and inexpensive. Further, the device should not require a high level of manual dexterity, and should be suitable for use by small children. The device should hold the eyeglasses firmly in place under various conditions of use. This is particularly important when used by children who frequently run and jump while playing. Finally, the device should not be subject to being inadvertently removed by the wearer in his normal activities. The device should be resistant to becoming loose or dislodged accidently, especially in those cases wherein the device is being used by very young children or by those having physical or mental handicaps.

OBJECTS OF THE INVENTION

The principal object of the present invention is to provide a head harness for eyeglasses.

Another object of the invention is to provide an inexpensive and reliable means for holding a person's eyeglasses comfortably but firmly to his head under various conditions of use.

Still another object of the invention is to provide a holder for eyeglasses that provides both vertical and horizontal support for the eyeglasses.

A further object of the present invention is to provide a simple means for holding a person's eyeglasses which is adapted for use with all types of eyeglasses.

PRINCIPAL FEATURES OF THE INVENTION

The principal features of the invention include a headgear having respective elastic straps, with one of the straps being connected from one temple over the head of the user to the other temple, and with the other strap being connected from the back ends of the temples around the back of the head of the user. A stabilizing strap is connected between the straps which go over and around the head of the user. The straps that are connected to the temples are attached by means of loops of a rubber-like material that grasps respective portions of the temples of the eyeglasses frame securely. The straps are made of an elastic material that firmly holds the eyeglasses to the head of the wearer, but it is also comfortable.

Other objects and features of the invention will become apparent from the following detailed description and drawing disclosing what are presently contemplated as being the best modes of the invention.

THE DRAWING

The sole FIGURE is a perspective drawing of a preferred embodiment of a head harness in accordance with the invention, showing the head harness attached to a pair of eyeglasses.

DETAILED DESCRIPTION OF THE DRAWING

As illustrated, the head harness comprises a temple strap 11 which is connected between the midsection of the temples 12 of the eyeglasses such that the strap 11 is adapted to fit over the head of the person wearing the eyeglasses. A second or ear strap 14 is connected between the back ends of the temples 12 such that the strap 14 is adapted to fit around the back of the head of the person wearing the eyeglasses. The straps 11 and 14 are connected to the temples 12 of the eyeglasses by loops 13 and 15, respectively, at the ends of the straps. The loops 13 are made of a rubber-like material that will grasp the frame securely when the loops are slid into place over the temples 12. Because the size of the temples of almost all eyeglass frames are near enough the same in cross-sectional dimension, the loops 13 need only be expandable over a limited range to be adaptable to virtually all eyeglasses.

A stabilizing strap 16 is sewn at one of its ends to the midsection of the temple strap 11, at its other end to the midsection of the second or ear strap 14. In the preferred embodiment, the straps 11, 14 and 16 are made of an elastic material sized to fit the head of a prospective user. The entire harness 10 can be made in different sizes, for example, children's sizes, adult sizes, and so forth. The tension of the elastic strap harness 10 allows for a secure fit yet one that is comfortable.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A head harness for eyeglasses comprising:
    a first elongated strap in a preadjusted length position for engagement over the head of a person, said elongated strap containing closed loops at each end for engaging the midsections of respective temples of a pair of eyeglasses;
    a second elongated strap in a preadjusted length position for engagement around the rear of the head of a person, said elongated strap containing closed loops at each end for engaging the back ends of respective temples of a pair of eyeglasses; and
    an elongated strap in a preadjusted length, said strap sewn at one of its ends to the mutually respective midsections of the first and second elongated straps, whereby the said straps provide a harness extending from the midsections of eyeglass temples over a user's head, from the free ends of eyeglass temples around the back of a user's head and from the midsections of the first and second straps across the top rear of a user's head.

* * * * *